(12) United States Patent
Cook, III et al.

(10) Patent No.: US 10,648,668 B2
(45) Date of Patent: May 12, 2020

(54) GAS TURBINE ENGINE CERAMIC COMPONENT ASSEMBLY AND BONDING MATERIAL

(71) Applicant: United Technologies Corporation, Farmington, CT (US)

(72) Inventors: Grant O. Cook, III, Tolland, CT (US); Michael G. Abbott, Jupiter, FL (US); Michael G. McCaffrey, Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 805 days.

(21) Appl. No.: 14/904,608

(22) PCT Filed: Jun. 18, 2014

(86) PCT No.: PCT/US2014/042848
§ 371 (c)(1),
(2) Date: Jan. 12, 2016

(87) PCT Pub. No.: WO2015/009388
PCT Pub. Date: Jan. 22, 2015

(65) Prior Publication Data
US 2016/0153659 A1 Jun. 2, 2016

Related U.S. Application Data

(60) Provisional application No. 61/856,156, filed on Jul. 19, 2013.

(51) Int. Cl.
*F23R 3/00* (2006.01)
*F23R 3/60* (2006.01)
(Continued)

(52) U.S. Cl.
CPC ............ *F23R 3/007* (2013.01); *C09J 5/00* (2013.01); *F01D 5/284* (2013.01); *F01D 9/02* (2013.01);
(Continued)

(58) Field of Classification Search
CPC .. F23R 2900/00005; F23R 2900/00017; F23R 3/002; F23R 3/007; F23R 3/60;
(Continued)

(56) References Cited

U.S. PATENT DOCUMENTS 2,686,655 A * 8/1954 Schorner ............... F01D 5/284
416/214 R
3,883,267 A * 5/1975 Baudier ............... F01D 5/282
416/230
(Continued)

FOREIGN PATENT DOCUMENTS

| WO | 2014204573 | 12/2014 |
| WO | 2015047485 | 4/2015 |
| WO | 2015054244 | 4/2015 |

OTHER PUBLICATIONS

Elastic properties of the elements (data page). (Oct. 26, 2017). In Wikipedia, The Free Encyclopedia. Retrieved 01:53, Jan. 19, 2018, from https://en.wikipedia.org/w/index.php?title=Elastic_properties_of_the_elements_(data_page)&oldid=807147326.*
(Continued)

*Primary Examiner* — Alain Chau
(74) *Attorney, Agent, or Firm* — Carlson, Gaskey & Olds, P.C.

(57) ABSTRACT

A gas turbine engine component assembly includes a ceramic component having a first thermal characteristic. A metallic component has a second thermal characteristic. A bonding material secures the ceramic component to the metallic component. The bonding material includes at least
(Continued)

one of a transient liquid phase bond and a partial transient liquid phase bond. The bonding material is configured to withstand a shear stress parameter relating to a differential between the first and second thermal characteristics.

19 Claims, 2 Drawing Sheets

(51) Int. Cl.
  *C09J 5/00* (2006.01)
  *F01D 25/24* (2006.01)
  *F01D 11/08* (2006.01)
  *F01D 5/28* (2006.01)
  *F01D 9/02* (2006.01)

(52) U.S. Cl.
  CPC ............ *F01D 11/08* (2013.01); *F01D 25/246* (2013.01); *F23R 3/002* (2013.01); *F23R 3/60* (2013.01); *C09J 2400/123* (2013.01); *C09J 2400/163* (2013.01); *F05D 2230/236* (2013.01); *F05D 2230/642* (2013.01); *F05D 2240/11* (2013.01); *F05D 2300/50212* (2013.01); *F23R 2900/00005* (2013.01); *F23R 2900/00017* (2013.01); *Y02T 50/672* (2013.01)

(58) Field of Classification Search
  CPC .... F23R 3/06; Y02T 50/672; F05D 2230/236; F05D 2230/642; F05D 2230/90; F01D 5/28; F01D 5/282; F01D 5/284; F01D 5/288; F01D 11/08; F01D 5/246; F01D 9/02; C09J 5/00; C09J 2400/123; C09J 2400/163; F23M 5/04; F23M 2900/05004
  See application file for complete search history.

(56) References Cited

U.S. PATENT DOCUMENTS

| | | | | |
|---|---|---|---|---|
| 3,922,851 | A * | 12/1975 | Irwin | F23R 3/007 60/800 |
| 4,005,988 | A * | 2/1977 | Paulonis | B23K 35/004 428/652 |
| 4,311,433 | A * | 1/1982 | Bratton | F01D 5/184 416/97 A |
| 4,314,007 | A * | 2/1982 | Gessinger | B22D 19/00 29/889.71 |
| 4,338,360 | A * | 7/1982 | Cavanagh | C23C 4/01 427/247 |
| 4,802,828 | A * | 2/1989 | Rutz | F01D 5/20 29/889.71 |
| 5,234,152 | A | 8/1993 | Glaeser | |
| 5,372,298 | A * | 12/1994 | Glaeser | B23K 20/023 228/121 |
| 6,132,175 | A * | 10/2000 | Cai | F01D 5/284 403/29 |
| 6,190,124 | B1 * | 2/2001 | Freling | C23C 28/321 415/173.4 |
| 6,454,156 | B1 * | 9/2002 | Taras, Jr. | B23K 20/16 228/119 |
| 6,571,560 | B2 * | 6/2003 | Tatsumi | F23R 3/007 60/753 |
| 6,602,053 | B2 | 8/2003 | Subramanian et al. | |
| 6,648,597 | B1 | 11/2003 | Widrig et al. | |
| 7,003,959 | B2 * | 2/2006 | Ackermann | F01D 25/08 60/753 |
| 7,178,325 | B2 | 2/2007 | Arbona | |
| 7,237,389 | B2 | 7/2007 | Ryan et al. | |
| 7,900,458 | B2 * | 3/2011 | James | B23P 15/04 415/115 |
| 8,167,537 | B1 | 5/2012 | Plank et al. | |
| 8,366,392 | B1 * | 2/2013 | Liang | F01D 5/147 416/96 A |
| 2002/0184892 | A1 * | 12/2002 | Calvez | F23R 3/007 60/796 |
| 2004/0164650 | A1 | 8/2004 | Xu et al. | |
| 2005/0150233 | A1 * | 7/2005 | Glessner | F16B 5/0208 60/796 |
| 2006/0242965 | A1 * | 11/2006 | Shi | F23R 3/007 60/796 |
| 2007/0275210 | A1 | 11/2007 | Heselhaus | |
| 2008/0078163 | A1 * | 4/2008 | Burdick | F02K 1/1207 60/226.1 |
| 2008/0087710 | A1 | 4/2008 | Glaeser | |
| 2008/0304959 | A1 * | 12/2008 | Benoit | B23K 35/0244 415/200 |
| 2010/0135812 | A1 | 6/2010 | Cairo et al. | |
| 2010/0260960 | A1 * | 10/2010 | Vance | F23R 3/007 428/44 |
| 2011/0142684 | A1 | 6/2011 | Campbell et al. | |
| 2012/0156044 | A1 | 6/2012 | Ortiz | |
| 2013/0014512 | A1 * | 1/2013 | Jarmon | F23R 3/16 60/772 |
| 2014/0165419 | A1 * | 6/2014 | Luthra | C04B 41/009 34/467 |

OTHER PUBLICATIONS

Extended European Search Report for European Application No. 14826220.7 dated Feb. 17, 2017.
International Preliminary Report on Patentability for PCT Application No. PCT/US2014/042848, dated Jan. 28, 2016.
Article titled Overview of Transient Liquid Phase and Partial Transient Liquid Phase Bonding Grant O. Cook III & Carl D. Sorensen. Published Online May 7, 2011.
International Search Report & Written Opinion for PCT/US2014/042848 dated Oct. 27, 2014.

* cited by examiner

GAS TURBINE ENGINE CERAMIC COMPONENT ASSEMBLY AND BONDING MATERIAL

CROSS-REFERENCE TO RELATED APPLICATIONS

This application claims priority to U.S. Provisional Application No. 61/856,156, which was filed on Jul. 19, 2013.

BACKGROUND

This disclosure relates to a gas turbine engine component for high-temperature use. More particularly, the disclosure relates to a bonding process for securing a gas turbine engine ceramic component to a metal component. The metal alloy component is attached to adjacent structure. The bonding material accommodates differentials in coefficients of thermal expansion and elasticity between the ceramic and metallic components.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Gas turbine engines produce extremely hot gases. One method to make engines more efficient is to increase the temperatures at which the engine operates. However, gas temperatures within the engine are limited so as to not exceed the capabilities of the engine component materials.

Without active cooling, exotic metallic alloys cannot withstand some of the extreme temperatures within the engine. Engine operating efficiency may be improved by reducing or eliminating this cooling requirement. To this end, ceramic-based materials, such as ceramic matrix composites (CMC), are used within the gas turbine engine gas flow path to enable higher temperatures with reduced cooling requirements. Typically, ceramic components must be secured to adjacent metallic structures. It is difficult to attach the dissimilar materials of the ceramic component and the metallic support structure due to the different rates of thermal expansion and ductility. Ceramic components are relatively low strength compared to metals, such that typical attachment configurations cannot be used.

SUMMARY

In one exemplary embodiment, a gas turbine engine component assembly includes a ceramic component having a first thermal characteristic. A metallic component has a second thermal characteristic. A bonding material secures the ceramic component to the metallic component. The bonding material includes at least one of a transient liquid phase bond and a partial transient liquid phase bond. The bonding material is configured to withstand a shear stress parameter relating to a differential between the first and second thermal characteristics.

In a further embodiment of any of the above, the gas turbine engine component assembly includes a structure and a fastening assembly securing the metallic component to the structure.

In a further embodiment of any of the above, the metallic component is a bracket.

In a further embodiment of any of the above, the metallic component is a portion of the fastening assembly.

In a further embodiment of any of the above, the fastening assembly includes a threaded fastener.

In a further embodiment of any of the above, the fastening assembly includes a hook.

In a further embodiment of any of the above, the ceramic is a ceramic matrix composite.

In a further embodiment of any of the above, the ceramic is a monolithic ceramic.

In a further embodiment of any of the above, the metal is a nickel alloy.

In a further embodiment of any of the above, the component assembly is one of a blade, vane, blade outer air seal, combustor liner, and exhaust liner.

In a further embodiment of any of the above, the ceramic component is a panel.

In a further embodiment of any of the above, the first and second thermal characteristics are a coefficient of thermal expansion.

In a further embodiment of any of the above, the bonding material includes multiple layers of refractory elements. The refractory elements are arranged in order of the coefficient of thermal expansion. The refractory element with a greatest coefficient of thermal expansion is arranged adjacent to the metallic component.

In a further embodiment of any of the above, the metallic component includes titanium. The refractory layers in the bond are composed of refractory elements arranged in order of decreasing coefficient of thermal expansion. The refractory element with a greatest coefficient of thermal expansion is arranged adjacent to the metallic component, and selected from a group consisting of the following elements, in descending order of the coefficient of thermal expansion: vanadium, rhodium, niobium, carbon, praseodymium, iridium, ruthenium, rhenium, tantalum, boron, hafnium, zirconium, osmium, chromium, molybdenum, tungsten, and silicon.

In a further embodiment of any of the above, the metallic component includes nickel. The refractory elements are arranged in order of decreasing coefficient of thermal expansion. The refractory element with a greatest coefficient of thermal expansion is arranged adjacent to the metallic component, and selected from a group consisting of the following elements, in descending order of the coefficient of thermal expansion: thulium, cobalt, samarium, erbium, palladium, iron, beryllium, holmium, thorium, promethium, yttrium, terbium, scandium, lutetium, dysprosium, neodymium, gadolinium, platinum, vanadium, rhodium, niobium, carbon, praseodymium, iridium, ruthenium, rhenium, tantalum, boron, hafnium, zirconium, osmium, chromium, molybdenum, tungsten, and silicon.

In a further embodiment of any of the above, the first and second thermal characteristics are a modulus of elasticity.

In a further embodiment of any of the above, the first and second thermal characteristics are a shear modulus.

In a further embodiment of any of the above, the bonding material includes multiple refractory elements arranged in order of increasing shear modulus. The refractory element with a greatest shear modulus is arranged adjacent to the metallic component, and selected from a group consisting of the following elements, in increasing order of shear modulus: europium, ytterbium, lanthanum, praseodymium, neodymium, promethium, molybdenum, samarium, gadolinium, terbium, dysprosium, yttrium, holmium, lutetium, gold, erbium, scandium, silver, and hafnium.

In a further embodiment of any of the above, the bonding material includes multiple layers of refractory elements. The refractory elements are arranged in order of thermal characteristic value.

In another exemplary embodiment, a gas turbine engine component assembly includes a ceramic component having a first thermal characteristic. A metallic component has a second thermal characteristic. A bonding material secures the ceramic component to the metallic component. The bonding material includes at least one of a transient liquid phase bond and a partial transient liquid phase bond. The bonding material is configured to withstand a shear stress parameter relating to a differential between the first and second thermal characteristics. The bonding material includes multiple refractory elements and is arranged in order of thermal characteristic value. The first and second thermal characteristics are one of a coefficient of thermal expansion, a modulus of elasticity, and a shear modulus. The component assembly is one of a blade, vane, blade outer air seal, combustor liner, and exhaust liner.

BRIEF DESCRIPTION OF THE DRAWINGS

The disclosure can be further understood by reference to the following detailed description when considered in connection with the accompanying drawings wherein.

DETAILED DESCRIPTION

Figure 1:
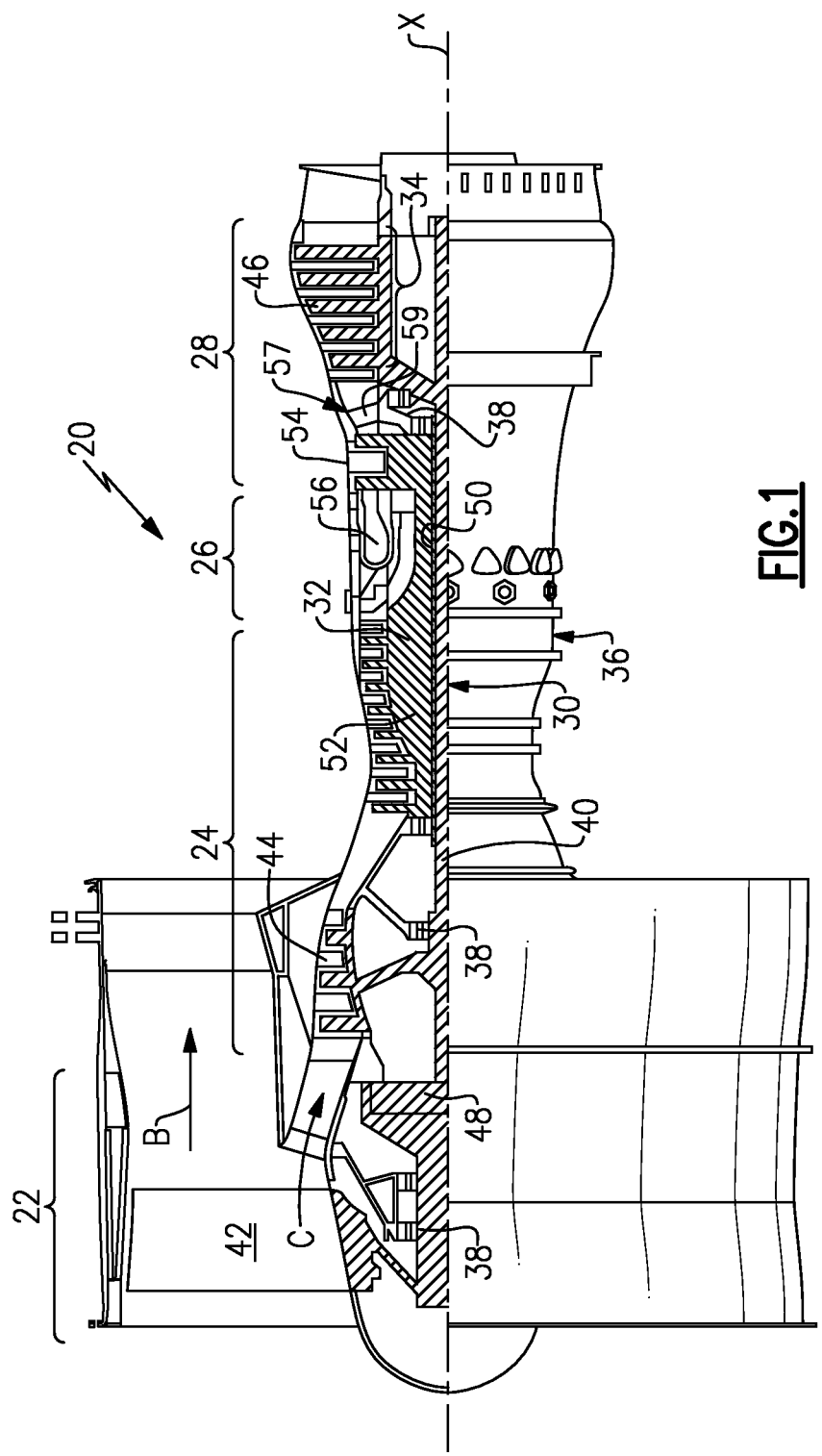
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high-pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low-spool enables a low pressure turbine to drive a fan via a gearbox, an intermediate spool that enables an intermediate-pressure turbine to drive a first compressor of the compressor section, and a high spool that enables a high-pressure turbine to drive a high-pressure compressor of the compressor section.

The example engine 20 generally includes a low-speed spool 30 and a high-speed spool 32 mounted for rotation about an engine central longitudinal axis X relative to an engine static structure 36 via several bearing systems 38. It should be understood that various bearing systems 38 at various locations may alternatively or additionally be provided.

The low-speed spool 30 generally includes an inner shaft 40 that connects a fan 42 and a low-pressure (or first) compressor section 44 to a low-pressure (or first) turbine section 46. The inner shaft 40 drives the fan 42 through a speed change device, such as a geared architecture 48, to drive the fan 42 at a lower speed than the low-speed spool 30. The high-speed spool 32 includes an outer shaft 50 that interconnects a high-pressure (or second) compressor section 52 and a high-pressure (or second) turbine section 54. The inner shaft 40 and the outer shaft 50 are concentric and rotate via the bearing systems 38 about the engine central longitudinal axis X.

A combustor 56 is arranged between the high-pressure compressor 52 and the high-pressure turbine 54. In one example, the high-pressure turbine 54 includes at least two stages to provide a double-stage high-pressure turbine 54. In another example, the high pressure turbine 54 includes only a single stage. As used herein, a "high-pressure" compressor or turbine experiences a higher pressure than a corresponding "low-pressure" compressor or turbine.

The example low-pressure turbine 46 has a pressure ratio that is greater than about five (5). The pressure ratio of the example low-pressure turbine 46 is measured prior to an inlet of the low-pressure turbine 46 as related to the pressure measured at the outlet of the low-pressure turbine 46 prior to an exhaust nozzle.

A mid-turbine frame 57 of the engine static structure 36 is arranged generally between the high pressure turbine 54 and the low-pressure turbine 46. The mid-turbine frame 57 further supports bearing systems 38 in the turbine section 28 as well as setting airflow entering the low-pressure turbine 46.

The core airflow C is compressed by the low-pressure compressor 44 then by the high-pressure compressor 52 mixed with fuel and ignited in the combustor 56 to produce high speed exhaust gases that are then expanded through the high-pressure turbine 54 and low-pressure turbine 46. The mid-turbine frame 57 includes vanes 59, which are in the core airflow path and function as an inlet guide vane for the low-pressure turbine 46. Utilizing the vane 59 of the mid-turbine frame 57 as the inlet guide vane for low-pressure turbine 46 decreases the length of the low-pressure turbine 46 without increasing the axial length of the mid-turbine frame 57. Reducing or eliminating the number of vanes in the low-pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ("TSFC")"—is the industry-standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry-standard temperature correction of $[(T_{ram} °R)/(518.7°R)]^{0.5}$. The "low corrected fan tip speed", as disclosed herein according to one non-limiting embodiment, is less than about 1150 ft/second.

Figure 2:
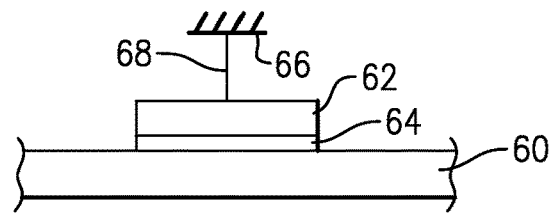
FIG. 2 is a schematic perspective view of a gas turbine engine component assembly illustrating a ceramic secured to a metallic component by a bonding material.

Referring to FIG. 2, a component assembly is shown for bonding a ceramic component 60 to a metal component 62 in a manner that withstands shear stresses during engine operation. The component assembly is a gas turbine engine component, for example, a blade, vane, blade outer air seal, combustor liner, exhaust liner or other component exposed to high temperatures within a gas turbine engine.

A bond 64 secures the ceramic component 60 to the metallic component 62. The ceramic component 60 has a first thermal characteristic, and the metal component 62 has a second thermal characteristic. The first and second thermal characteristics may be at least one of a coefficient of thermal expansion (CTE), modulus of elasticity (also known as elastic modulus or Young's modulus), and shear modulus.

The first and second thermal characteristics are different than one another, and the differential between these characteristics causes shear stresses at the bond interface between the ceramic and metallic components 60, 62. Sufficiently high shear stress will cause the ceramic and metallic components to undesirably detach from one another.

The bond 64 includes at least one of a transient liquid phase bond and a partial transient liquid phase bond. The bonding material used to produce bond 64 is configured to withstand a shear stress parameter relating to the differential between the first and second thermal characteristics. Selection of an element to compose the majority of the bonding material having a CTE between those of the ceramic and metallic materials can provide a graded structure in terms of CTE, helping to mitigate thermally induced strains. Refractory elements that have lower CTEs than that of titanium include (in order of descending CTE) vanadium, rhodium, niobium, carbon, praseodymium, iridium, ruthenium, rhenium, tantalum, boron, hafnium, zirconium, osmium, chromium, molybdenum, tungsten, and silicon. Refractory elements that have lower CTEs than that of nickel include (in order of descending CTE) thulium, cobalt, samarium, erbium, palladium, iron, beryllium, holmium, thorium, promethium, yttrium, terbium, scandium, lutetium, dysprosium, neodymium, gadolinium, platinum, and those elements listed above with respect to titanium. By the same token, an element can be selected to compose the majority of the bonding material to provide a graded structure in terms of elastic or shear modulus or a low elastic or shear modulus to provide compliance against thermally induced strains. Examples of refractory elements with lower shear moduli include (in order of increasing modulus) europium, ytterbium, lanthanum, praseodymium, neodymium, promethium, molybdenum, samarium, gadolinium, terbium, dysprosium, yttrium, holmium, lutetium, gold, erbium, scandium, silver, and hafnium. The bonding material is selected based upon the materials to be bonded, here, the type of ceramic and the type of metal. In one example, the ceramic is a ceramic matrix composite (CMC), and, in another example, the ceramic is a monolithic ceramic. Example ceramics include SiC/SiC, SiC/SiNC, SiNC/SiC, SiNC/SiNC, SiC, and Si3N4 One typical metal is a nickel alloy, although other metals may be used, such as titanium.

The thickness of the bonding material may be selected based upon surface characteristics of components to be bonded, for example the surface roughness. The surface roughness may have an effect on how thin the interlayer material(s) can be with smoother surface finishes allowing for thinner interlayers.

The bonding material 64 is a material that results in a solid bond by the process of transient liquid phase (TLP) or partial transient liquid phase (PTLP) bonding. Transient liquid phase (TLP) and partial transient liquid phase (PTLP) bonding are described in detail in "Overview of Transient Liquid Phase and Partial Transient Liquid Phase Bonding", J. Mater. Sci. (2011) 46:5305-5323 (referred to as "the article") is incorporated herein by reference in its entirety. In PTLP bonding, bonding material may be a multilayer structure comprising thin layers of low-melting-point metals or alloys placed on each side of a much thicker layer of a refractory metal or alloy core. Upon heating to a bonding temperature, a liquid is formed via either direct melting of a lower-melting layer or a eutectic reaction of a lower-melting layer with the refractory metal layer. The liquid that is formed wets each ceramic substrate, while also diffusing into adjacent structure. During the process, the liquid regions solidify isothermally and homogenization of the entire bond region leads to a solid refractory bond.

Example bond alloy layers (separated by pipe characters) for bonding silicon carbide to silicon carbide fiber reinforced silicon carbide (SiC/SiC) or to silicon carbide fiber reinforced silicon nitrogen carbide (SiC/SiNC) are C|Si|C, Cu—Au—Ti|Ni|Cu—Au—Ti, and Ni—Si|Mo|Ni—Si multilayer metal structures.

Example bond alloy layers for bonding silicon nitride to silicon carbide fiber reinforced silicon carbide (SiC/SiC) or silicon carbide fiber reinforced silicon nitrogen carbide (SiC/SiNC) are Al|Ti|Al, Au|Ni—Cr|Au, Cu—Au|Ni|Cu—Au, Co|Nb|Co, Co|Ta|Co, Co|Ti|Co, Co|V|Co, Cu—Ti|Pd|Cu—Ti, and Ni|V|Ni multilayer metal structures.

Additional example bond alloy layers include non-symmetric multilayer metal structures, such as Cu—Au—Ti-|Ni|Cu—Au, Au|Ni—Cr|Cu—Au, Au|Ni—Cr|Cu—Au—Ti, and Al|Ti|Co. These non-symmetric structures can accommodate for differences in wetting characteristics between the ceramic material and the CMC material.

It should be understood that other bonding materials can be used according to the article and based upon the materials and characteristics of the components to be bonded. In TLP and PTLP bonding, the bonding material wets the ceramic and diffuses into the metal to cause isothermal solidification. The interlayer material can be provided by an alloy foil, multiple layers of elemental foils, or combinations thereof. Moreover, not only may foils be used, but also powder, powder compact, braze paste, and/or electroplated or physical-vapor-deposited bonding material may be applied to the ceramic and/or metallic components.

Figure 3A:
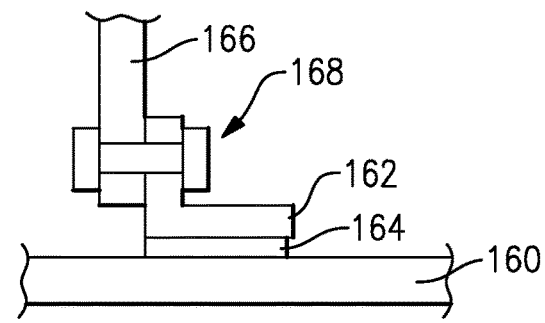
FIG. 3A is a schematic view of one example component assembly attachment.

A variety of attachments may be used to minimize shear stress for a particular application. Referring to FIG. 2, a schematically illustrated assembly 68 secures the metal component 62 to a structure 66, which may be static or rotating structure. In the example shown in FIG. 3A, the ceramic component 160 is a panel, and the metallic component 162 is a bracket secured directly to the panel by a TLP or PTLP bond 164. The bracket is secured to the structure 166 by a threaded fastening assembly 168.

Figure 3B:
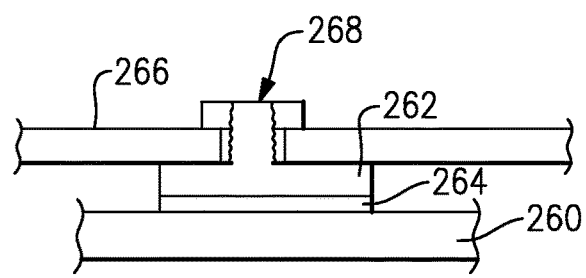
FIG. 3B is a schematic view of another example component assembly attachment.

Referring to FIG. 3B, the ceramic component 260 is a panel, and the metallic component 262 is a portion of the fastening assembly 268, for example a stud, secured directly to the panel by a TLP or PTLP bond 264. The stud is secured to the structure 266 by another portion of the fastening assembly 268.

Figure 3C:
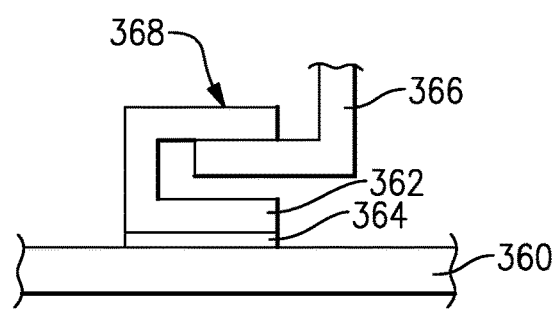
FIG. 3C is a schematic view of another example component assembly attachment.

Referring to FIG. 3C, a hook 362 is secured directly to the ceramic component 360 by a TLP or PTLP bond 364. The hook 362 is supported relative to the structure 366 by an interlocking attachment that provides the fastening assembly 368.

Although example embodiments have been disclosed, a worker of ordinary skill in this art would recognize that certain modifications would come within the scope of the claims. For that and other reasons, the following claims should be studied to determine their true scope and content.

What is claimed is:

1. A gas turbine engine component assembly comprising:
a ceramic component having a first thermal characteristic;
a metallic component having a second thermal characteristic;
a bonding material securing the ceramic component to the metallic component, the bonding material including at least one of a transient liquid phase bond and a partial transient liquid phase bond, the bonding material configured to withstand a shear stress parameter relating to a differential between the first and second thermal characteristics, wherein the bonding material includes multiple refractory elements, the refractory elements are arranged in order of coefficient of thermal expansion, the refractory element with a greatest coefficient of thermal expansion arranged adjacent to the metallic component; and
wherein the component assembly is one of a blade, vane, blade outer air seal, combustor liner, and exhaust liner.

2. The gas turbine engine component assembly according to claim 1, comprising a structure and a fastening assembly securing the metallic component to the structure.

3. The gas turbine engine component assembly according to claim 2, wherein the metallic component is a portion of the fastening assembly.

4. The gas turbine engine component assembly according to claim 2, wherein the ceramic is a monolithic ceramic.

5. The gas turbine engine component assembly according to claim 1, wherein the ceramic is a ceramic matrix composite.

6. The gas turbine engine component assembly according to claim 1, wherein the metallic component is a nickel alloy.

7. The gas turbine engine component assembly according to claim 1, wherein the first and second thermal characteristics are a coefficient of thermal expansion.

8. The gas turbine engine component assembly according to claim 1, wherein the metallic component includes titanium, and the refractory elements arranged in order of decreasing coefficient of thermal expansion, the refractory element with a greatest coefficient of thermal expansion arranged adjacent to the metallic component, and the refractory element with the greatest coefficient of thermal expansion selected from a group consisting of the following elements, in descending order of coefficient of thermal expansion: vanadium, rhodium, niobium, carbon, praseodymium, iridium, ruthenium, rhenium, tantalum, boron, hafnium, zirconium, osmium, chromium, molybdenum, tungsten, and silicon.

9. The gas turbine engine component assembly according to claim 1, wherein the metallic component includes nickel, and the refractory elements are arranged in order of decreasing coefficient of thermal expansion, the refractory element with a greatest coefficient of thermal expansion arranged adjacent to the metallic component, and the refractory element with the greatest coefficient of thermal expansion selected from a group consisting of the following elements, in descending order of the coefficient of thermal expansion: thulium, cobalt, samarium, erbium, palladium, iron, beryllium, holmium, thorium, promethium, yttrium, terbium, scandium, lutetium, dysprosium, neodymium, gadolinium, platinum, vanadium, rhodium, niobium, carbon, praseodymium, iridium, ruthenium, rhenium, tantalum, boron, hafnium, zirconium, osmium, chromium, molybdenum, tungsten, and silicon.

10. The gas turbine engine component assembly according to claim 1, wherein the first and second thermal characteristics are a modulus of elasticity.

11. The gas turbine engine component assembly according to claim 1, wherein the first and second thermal characteristics are a shear modulus.

12. The gas turbine engine component assembly according to claim 11, wherein the bonding material includes multiple refractory elements arranged in order of increasing shear modulus, the refractory element with a greatest shear modulus arranged adjacent to the metallic component, and the refractory element with a greatest coefficient of thermal expansion selected from a group consisting of the following elements, in increasing order of shear modulus: europium, ytterbium, lanthanum, praseodymium, neodymium, promethium, molybdenum, samarium, gadolinium, terbium, dysprosium, yttrium, holmium, lutetium, gold, erbium, scandium, silver, and hafnium.

13. The gas turbine engine component assembly according to claim 1, wherein the bonding material includes multiple layers of refractory elements, the refractory elements arranged in order of thermal characteristic value.

14. The gas turbine engine component assembly according to claim 1, the bonding material including a partial transient liquid phase bond.

15. A gas turbine engine component assembly comprising:
a ceramic component having a first thermal characteristic;
a metallic component having a second thermal characteristic;
a bonding material securing the ceramic component to the metallic component, the bonding material including at least one of a transient liquid phase bond and a partial transient liquid phase bond, the bonding material configured to withstand a shear stress parameter relating to a differential between the first and second thermal characteristics, wherein the bonding material includes multiple refractory elements, the refractory elements are arranged in order of coefficient of thermal expansion, the refractory element with a greatest coefficient of thermal expansion arranged adjacent to the metallic component; and wherein the ceramic component is a panel; and comprising a structure and a fastening assembly securing the metallic component to the structure.

16. The gas turbine engine component assembly according to claim 15, wherein the metallic component is a bracket.

17. The gas turbine engine component assembly according to claim 15, wherein the fastening assembly includes a threaded fastener.

18. The gas turbine engine component assembly according to claim 15, wherein the fastening assembly includes a hook.

19. A gas turbine engine component assembly comprising:
  a ceramic component having a first thermal characteristic;
  a metallic component having a second thermal characteristic;
  a bonding material securing the ceramic component to the metallic component, the bonding material including at least one of a transient liquid phase bond and a partial transient liquid phase bond, the bonding material configured to withstand a shear stress parameter relating to a differential between the first and second thermal characteristics, wherein the first and second thermal characteristics are one of a coefficient of thermal expansion, a modulus of elasticity, and a shear modulus;
  wherein the bonding material includes multiple refractory elements arranged in order of increasing shear modulus, the refractory element with a greatest shear modulus arranged adjacent to the metallic component, and the refractory element with a greatest coefficient of thermal expansion selected from a group consisting of the following elements, in increasing order of shear modulus: europium, ytterbium, lanthanum, praseodymium, neodymium, promethium, molybdenum, samarium, gadolinium, terbium, dysprosium, yttrium, holmium, lutetium, gold, erbium, scandium, silver, and hafnium; and
  the component assembly is one of a blade, vane, blade outer air seal, combustor liner, and exhaust liner.

* * * * *